US009684942B2

(12) United States Patent
Anantharaman et al.

(10) Patent No.: US 9,684,942 B2
(45) Date of Patent: Jun. 20, 2017

(54) LINK AGGREGATOR FOR AN ELECTRONIC DISPLAY

(71) Applicant: APPLE INC., Cupertino, CA (US)

(72) Inventors: Sreeraman Anantharaman, Mountain View, CA (US); Colin Whitby-Strevens, Ben Lomond, CA (US)

(73) Assignee: Apple Inc., Cupertino, CA (US)

( * ) Notice: Subject to any disclaimer, the term of this patent is extended or adjusted under 35 U.S.C. 154(b) by 198 days.

(21) Appl. No.: 14/024,428

(22) Filed: Sep. 11, 2013

(65) Prior Publication Data
US 2015/0070364 A1 Mar. 12, 2015

(51) Int. Cl.
G09G 5/00 (2006.01)
G06T 1/20 (2006.01)
H04L 25/03 (2006.01)
H03H 21/00 (2006.01)

(52) U.S. Cl.
CPC ............... *G06T 1/20* (2013.01); *G09G 5/006* (2013.01); *G09G 2352/00* (2013.01); *G09G 2370/12* (2013.01)

(58) Field of Classification Search
None
See application file for complete search history.

(56) References Cited

U.S. PATENT DOCUMENTS

| 7,405,738 B2 | 7/2008 | Mance |
| 8,068,416 B2 | 11/2011 | Hu |
| 8,340,529 B2 | 12/2012 | Shastri et al. |
| 8,369,808 B2 | 2/2013 | Adams |
| 8,395,605 B2 | 3/2013 | Sisto |
| 2004/0218599 A1* | 11/2004 | Kobayashi .................... 370/389 |

(Continued)

FOREIGN PATENT DOCUMENTS

| TW | I233517 B | 6/2005 |
| WO | 03/056663 A1 | 7/2003 |

(Continued)

OTHER PUBLICATIONS

International Search Report and Written Opinion for PCT Application No. PCT/US2014/049239 dated Oct. 15, 2014; 15 pgs.

(Continued)

*Primary Examiner* — Barry Drennan
*Assistant Examiner* — Schiller Hill
(74) *Attorney, Agent, or Firm* — Fletcher Yoder PC

(57) ABSTRACT

Video data and auxiliary data may be sent between a processor and a display device via a single cable using a link aggregator. As such, the link aggregator may receive a first parallel signal that may include the video data and a second parallel signal that may include auxiliary data from the processor. The link aggregator may then send the first parallel signal and the second parallel signal as an aggregated signal to the display device. Upon receiving the aggregated signal at the display device, the link aggregator may de-aggregate the aggregated signal into the first parallel signal and the second parallel signal. The link aggregator may then send the first parallel signal and the second parallel signal to a timing controller of the display device, such that the timing controller may display the video data using the display device.

25 Claims, 11 Drawing Sheets

(56) References Cited

U.S. PATENT DOCUMENTS

| | | |
|---|---|---|
| 2005/0262280 A1* | 11/2005 | Cherukuri .......... G06F 13/4273 |
| | | 710/106 |
| 2009/0156260 A1* | 6/2009 | Derengowski et al. ...... 455/566 |
| 2009/0182917 A1 | 7/2009 | Kim |
| 2010/0026790 A1 | 2/2010 | Ohba et al. |
| 2010/0043045 A1* | 2/2010 | Shakiba et al. ............... 725/119 |
| 2011/0102986 A1* | 5/2011 | Asakura et al. ......... 361/679.01 |
| 2011/0145468 A1 | 6/2011 | Diard |
| 2011/0161547 A1* | 6/2011 | Barbiero ................. G06F 13/00 |
| | | 710/316 |
| 2012/0045015 A1 | 2/2012 | Shimizu et al. |
| 2012/0057261 A1* | 3/2012 | Poulton ............... G06F 13/4072 |
| | | 361/56 |
| 2012/0079162 A1* | 3/2012 | Jaramillo ............... G09G 5/006 |
| | | 710/316 |
| 2012/0206864 A1 | 8/2012 | Bohn et al. |
| 2013/0051483 A1* | 2/2013 | Wyatt ............... H04L 25/03885 |
| | | 375/259 |

FOREIGN PATENT DOCUMENTS

| | | |
|---|---|---|
| WO | 2010099178 A2 | 9/2010 |
| WO | 2013076882 S1 | 5/2013 |

OTHER PUBLICATIONS

Taiwanese Search Report for Taiwanese Application No. 103128341 dated Dec. 25, 2015; 11 pgs.

* cited by examiner

LINK AGGREGATOR FOR AN ELECTRONIC DISPLAY

BACKGROUND

The present disclosure relates generally to a display port link between a processor and a display device. More specifically, the present disclosure relates to reducing a number of cables used in the display port link between the processor and the display device using a link aggregator.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Generally, image data to be depicted on a display device may be transmitted from a processor to a display device via a cable bundle that includes a number of micro-coaxial (µ-coax) cables. In a laptop platform, for example, the cable bundle may pass from an Embedded DisplayPort (eDP) connector located on a motherboard, through a clutch barrel, to an eDP connector located on the display device. To display the image data provided by the processor located on the motherboard, the clutch barrel may be large enough to house the cable bundle, such that the cable bundle is routed between the motherboard and the display device. As such, the number of micro-coaxial cables in the cable bundle may affect how the clutch barrel should be sized, what components may be housed by the clutch barrel, and the like. To use more aggressive (i.e., smaller) form factor designs in laptops and other computing devices, it may be beneficial to reduce the number of cables used in the cable bundle to send image data from the processor located in the motherboard to the display device.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure is generally related to reducing a size of a cable bundle used for communication between a processor (e.g., graphics processing unit) and a display device. To reduce the number of micro-coaxial cables to link the processor and the display device, a display port link aggregator may aggregate the data being communicated between them, such that the aggregated data may be sent via a single cable. In one embodiment, the display port link aggregator may be integrated into the motherboard and the display device of a laptop-computing device or the like. Here, the display port link aggregator may include a transmitter component disposed on the motherboard and a receiver component disposed on the display device. The transmitter component may receive image data to be depicted on the display device from the processor. The image data may include a main video signal (video data) and an auxiliary signal. The main video signal may be received by the transmitter component as a first parallel signal stream and the auxiliary signal may be received by the transmitter component as a second parallel signal stream. The transmitter component may then aggregate the two parallel signal streams using a multiplexer to generate a multiplexed parallel signal stream. After generating the multiplexed parallel signal stream, the transmitter component may convert the multiplexed parallel signal stream into a serial signal stream and transmit the serial signal stream to the display device via a single micro-coaxial cable.

After receiving the serial signal stream from the transmitter component, the receiver component of the display port link aggregator may convert the serial signal stream back to a parallel signal stream. The receiver component may then de-aggregate or de-multiplex the re-generated parallel signal stream, thereby reproducing the first parallel signal stream and the second parallel signal stream that may include the main video signal and the auxiliary signal, respectively. The receiver component may then forward the first and second parallel signal streams to a timing controller (TCON) of the display device, such that the timing controller may be used to display images that correspond to the main video signal embedded within the first parallel signal stream.

Using a similar process as described above, the receiver component may send an auxiliary signal and a Hot Plug Detect (HPD) signal received from the timing controller of the display device to the processor located on the motherboard. In this case, the receiver component may combine the auxiliary signal and the HPD signal and may send the combined auxiliary and HPD signal to the transmitter component of the display port link aggregator. The transmitter component may then decode the combined auxiliary and HPD signal to recover the auxiliary signal and the HPD signal sent from the timing controller. The transmitter component may then send the recovered auxiliary signal and the recovered HPD signal to the processor.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to systems and methods for aggregating data transmitted between a processor and a display device. In certain embodiments, a display port link aggregator may include a transmitter component embedded in a motherboard of a computing device and a receiver component embedded in a display device of the computing device. The transmitter component may receive image data from the processor located on the motherboard and may aggregate the received image data. The aggregated image data may then be transmitted from the transmitter component to the receiver component embedded on the display device via a single cable. Upon receiving the aggregated image data, the receiver component may de-aggregate the aggregated image data, such that the de-aggregated image data is substantially similar to the image data received by the transmitter component from the processor.

In the same manner, the receiver component may receive data signals from a component on the display device, such that the data signals are to be transmitted to the processor of the computing device. After receiving the data signals, the receiver component may combine the data signals and send the combined data signals to the transmitter component embedded on the motherboard via the single cable. Upon receiving the combined data signals, the transmitter component may decode the combined data signals, such that the decoded data signals are substantially similar to the data signals received by the receiver component from the component of the display device. By aggregating and combining the data transmitted between the motherboard and the display device, the display port link aggregator may enable the motherboard and the display device to communicate with each other using just one cable (e.g., one micro-coaxial cable). As a result, the space available in a clutch barrel of the computing device may increase or the clutch barrel may be modified to fit a smaller form factor.

Figure 1:
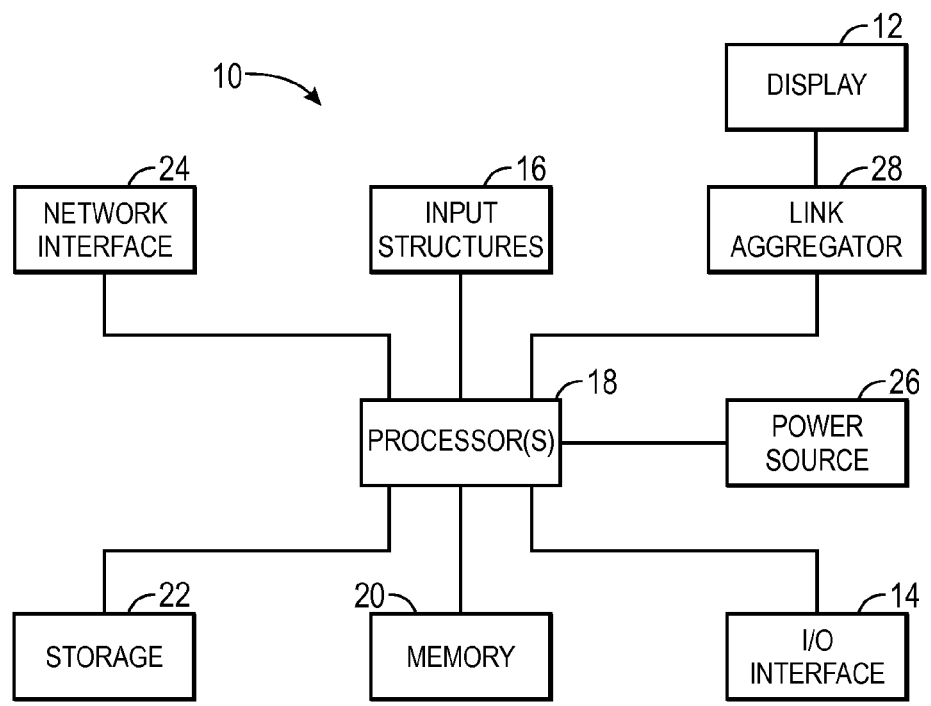
FIG. 1 is a block diagram of exemplary components of an electronic device, in accordance with an embodiment.

A variety of electronic devices may incorporate systems and methods for aggregating data transmitted between a processor and a display device. An example of a suitable electronic device may include various internal and/or external components, which contribute to the function of the device. FIG. 1 is a block diagram illustrating the components that may be present in such an electronic device 10 and which may allow the electronic device 10 to function in accordance with the methods discussed herein. The various functional blocks shown in FIG. 1 may include hardware elements (including circuitry), software elements (including computer code stored on a computer-readable medium), or a combination of both hardware and software elements. It should further be noted that FIG. 1 is merely one example of a particular implementation and is merely intended to illustrate the types of components that may be present in the electronic device 10. For example, in the presently illustrated embodiment, these components may include a display 12, I/O ports 14, input structures 16, one or more processors 18, a memory device 20, a non-volatile storage 22, a networking device 24, a power source 26, a link aggregator 28, and the like.

With regard to each of these components, the display 12 may be used to display various images generated by the electronic device 10. Moreover, the display 12 may be a touch-screen liquid crystal display (LCD), for example, which may enable users to interact with a user interface of the electronic device 10. In some embodiments, the display 12 may be a MultiTouch™ display that can detect multiple touches at once.

The I/O ports 14 may include ports configured to connect to a variety of external I/O devices, such as a power source, headset or headphones, peripheral devices such as keyboards or mice, or other electronic devices 10 (such as handheld devices and/or computers, printers, projectors, external displays, modems, docking stations, and so forth).

The input structures 16 may include the various devices, circuitry, and pathways by which user input or feedback is provided to the processor 18. Such input structures 16 may be configured to control a function of the electronic device 10, applications running on the electronic device 10, and/or any interfaces or devices connected to or used by the electronic device 10.

The processor(s) 18 may provide the processing capability to execute the operating system, programs, user and application interfaces, and any other functions of the electronic device 10. As such, the processors 18 may include, for example, a central processing unit (CPU), a graphics processing unit (GPU), or the like. The instructions or data to be processed by the processor(s) 18 may be stored in a computer-readable medium, such as the memory 20. The memory 20 may be provided as a volatile memory, such as random access memory (RAM), and/or as a non-volatile memory, such as read-only memory (ROM). The components may further include other forms of computer-readable media, such as the non-volatile storage 22, for persistent storage of data and/or instructions. The non-volatile storage 22 may include flash memory, a hard drive, or any other optical, magnetic, and/or solid-state storage media. The non-volatile storage 22 may be used to store firmware, data files, software, wireless connection information, and any other suitable data.

In certain embodiments, the processor 18 may send image data, such as a video signal and auxiliary data, to the display 12 via the link aggregator 28. Upon receiving the image data, the display 12 may display the images or video that corresponds to the image data on a screen. The link aggregator 28 may include a transmitter component disposed in a motherboard where the processor 18 may be affixed. The link aggregator 28 may also include a receiver component disposed in the display 12. The link aggregator 28 may use the transmitter component and the receiver component to facilitate communication between the processor 18 and the display 12 via a single serial communication link. Additional details regarding the link aggregator 28 will be described below with reference to FIG. 3.

The network device 24 may include a network controller or a network interface card (NIC). Additionally, the network device 24 may be a Wi-Fi device, a radio frequency device, a Bluetooth® device, a cellular communication device, or the like. The network device 24 may allow the electronic device 10 to communicate over a network, such as a Local Area Network (LAN), Wide Area Network (WAN), or the Internet. The power source 26 may include a variety of power types such as a battery or AC power.

Figure 2:
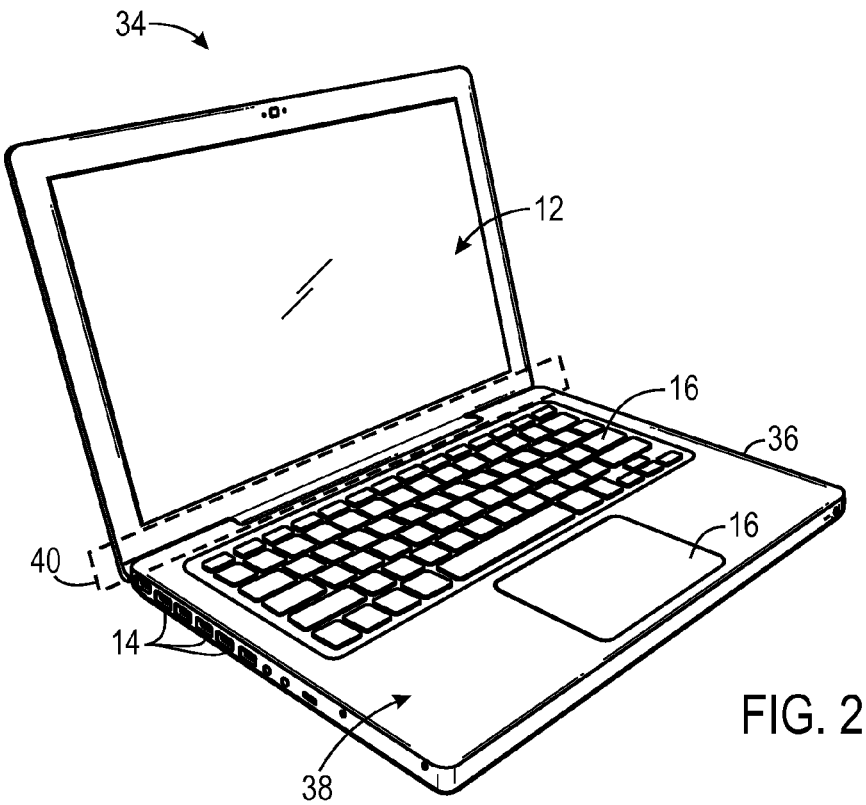
FIG. 2 is a view of a computer, in accordance with an embodiment.

With the foregoing in mind, FIG. 2 illustrates an electronic device 10 in the form of a computer 34. That is, FIG. 2 illustrates a laptop computer, but it should be noted that while the depicted computer 34 is provided in the context of a laptop computer, other types of computing devices such as handheld or tablet devices (e.g., cellular telephones, media players for playing music and/or video, personal data organizers, handheld game platforms, and/or combinations of such devices) may also be suitably provided as the electronic device 10. Moreover, the computer 34 may include computers that are generally portable (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, iPad® or Mac Pro® available from Apple Inc. The depicted computer 34 includes a display 12, input structures 16, input/output ports 14, a housing 36, a motherboard 38, and a clutch barrel 40.

The display 12 may be a touch-screen LCD used to display a graphical user interface (GUI) that allows a user to interact with the computer 34. The display 12 may be communicatively coupled to the processor 18 which may be disposed on the motherboard 38 inside the computer 34. In one embodiment, the display 12 may be communicatively coupled to the processor 18 via a single micro-coaxial cable routed through the clutch barrel 40. The clutch barrel 40 may be part of the housing 36 of the computer 34 and may include hinge that may enable the display 12 to move about an axis that travels through the clutch barrel 40. In addition to including a hinge, the clutch barrel 40 may enclose one or more cables that may be routed between the processor 18 and the display 12 to enable communication between the processor 18 and the display 12. As such, one determining factor in the size of the clutch barrel 40 may include a number of cables routed between the processor 18 and the display 12 via the clutch barrel 40. Because the link aggregator 28 may reduce the number of cables routed between the processor 18 and the display 12, the clutch barrel 40 may be designed to have a smaller form factor or may include additional space to store other components.

The input structures 16 (such as a keyboard and/or touchpad) may be used to interact with the computer 34, such as to start, control, or operate a GUI or applications running on the computer 34. For example, a keyboard and/or touchpad may allow a user to navigate a user interface or application interface displayed on the display 12.

As depicted, the electronic device 10 in the form of the computer 34 may also include various input and output ports 14 to allow connection of additional devices. For example, the computer 50 may include an I/O port 14, such as a USB port or other port, suitable for connecting to another electronic device, a projector, a supplemental display, and so forth. The computer 34 may include network connectivity, memory, and storage capabilities, as described with respect to FIG. 1. As a result, the computer 34 may store and execute a GUI and other applications.

Link Aggregator

Figure 3:
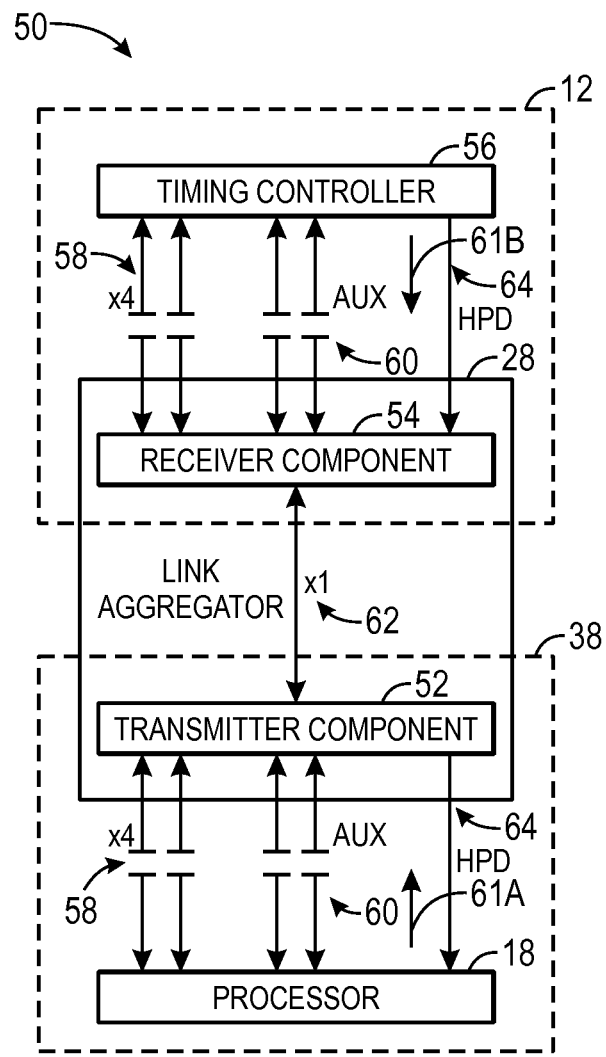
FIG. 3 is a block diagram of a display port link aggregator integrated into the computer of FIG. 2, in accordance with an embodiment.

As mentioned above, additional details regarding the link aggregator 28 will now provided with reference to FIG. 3. FIG. 3 illustrates a data communication system 50 that employs the link aggregator 28 to facilitate communication between the motherboard 38 and the display 12. As shown in FIG. 3, the link aggregator 28 may include a transmitter component 52 and a receiver component 54. In certain embodiments, the link aggregator 28 may include a processor or the like to control the operations of various components within the link aggregator 28 such as the transmitter component 52 and the receiver component 54.

The transmitter component 52 may be communicatively coupled to the processor 18 and to the receiver component 54, and the receiver component 54 may be communicatively coupled to a timing controller 56 (TCON) of the display 12 and the transmitter component 52. The timing controller 56 may control the timing of when pixels, light emitting diodes (LEDs), or other display components in the display 12 may operate. As such, the timing controller 56 may receive image data or video data that may have originated at the processor 18, such that the image data or video data may indicate how the display components should operate.

In certain embodiments, the image data or video data may be routed to the timing controller 56 from the processor 18 via the link aggregator 28. The image data or video data may be routed according to, for example, an Embedded DisplayPort (eDP) standard. However, it should be noted that the image data or video data may be routed to the timing controller 56 from the processor 18 using any other suitable display protocol.

When transmitting video data 58, the processor 18 may transmit video data 58 via a number of alternating current (AC) coupled differential pair cables (e.g., 4 micro-coaxial cables) to the transmitter component 42. In one embodiment, the video data 58 may include image data or video data that corresponds to the images or video to be depicted on the display 12. As such, the processor 18 may send the video data 58 via high-bandwidth communication mediums (e.g., four differential pair cables) that operate at, for example, 1.62 Gbps, 2.7 Gbps, 5.4 Gbps, or the like to ensure that the video data 58 is received by the transmitter component 42 in a timely manner. In one embodiment, the communication of the video data 58 to the transmitter component 52 may be unidirectional or transmitted from the processor 18 to the display 12, but not vice-versa.

In addition to the video data 58, the processor 18 may also send auxiliary data 60 to the transmitter component 52. The auxiliary data 60 may include sideband data that may be used for link training protocols, hand shaking protocols, control signals, clock signals, and the like. Generally, the auxiliary data 60 may originate from the processor 18 or the timing controller 56. As such, the auxiliary data 60 may be transmitted via a bi-directional communication medium (e.g., single bi-directional differential pair) to facilitate communication between the processor 18 and the timing controller 56, and vice-versa. In certain embodiments, the auxiliary data 60 may include a significantly smaller amount of data as compared to the video data 58 and thus may be communicated via an AC-coupled lower-bandwidth communication medium that operates at, for example, 1 Mbps or the like.

After receiving the video data 58 and the auxiliary data 60 from the processor 18, the transmitter component 52 may aggregate the video data 58 and the auxiliary data 60 and transmit the aggregated data via a single cable 62 (e.g., one micro-coaxial cable) to the receiver component 54. The receiver component 54 may, in turn, de-aggregate the aggregated data, such that the de-aggregated data corresponds to the video data 58 and the auxiliary data 60 provided by the processor 18. The receiver component 54 may then transmit the video data 58 and the auxiliary data 60 to the timing controller 56, which may be used to control the operation of the display 12 to display images or video embedded within the video signal 58.

The timing controller 56 may also communicate with the processor 18 via the link aggregator 28 in a similar manner as described above. That is, the timing controller 56 may transmit auxiliary data 60 and a Hot Plug Detection (HPD) signal 64 to the receiver component 54, which may be used to forward the auxiliary data 60 and the HPD signal 64 to the processor 18. The HPD signal 64 may provide an indication to the processor 18 that the display 12 is present and communicatively coupled to the processor 18. As such, the HPD signal 64 may be a uni-directional signal that may be transmitted from the timing controller 56 to the processor 18, but not vice-versa. In certain embodiments, the HPD signal 64 may pulse and provide an interrupt to the timing controller 56.

After receiving the auxiliary data 60 and the HPD signal 64 from the timing controller 56, the receiver component 54 may combine the auxiliary data 60 and the HPD signal 64 and send the combined data to the transmitter component 52 via the single cable 62. The transmitter component 52 may decode the combined data received from the receiver component 54 into the auxiliary data 60 and the HPD signal 64 provided by the timing controller 56. The transmitter component 52 may then transmit the auxiliary data 60 and the HPD signal 64 to the processor 18, thereby facilitating the communication between the timing controller 56 and the processor 18.

Figure 4:
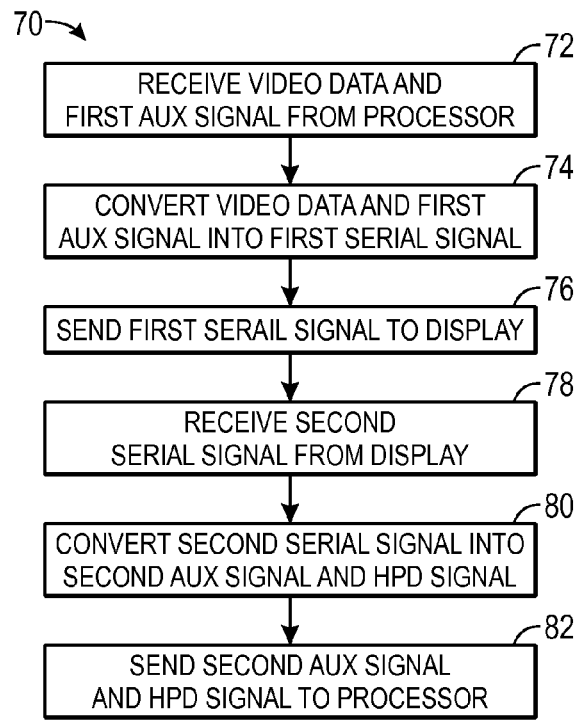
FIG. 4 is flowchart that illustrates a method for communicating between a processor and a display device of the computer in FIG. 2 using the display port link aggregator of FIG. 3 from a perspective of a transmitter component located on a motherboard of the computer, in accordance with an embodiment.

With the foregoing discussion in mind, FIG. 4 depicts a flowchart of a method 70 that the transmitter component 52 may implement when transmitting data from the processor 18 to the display 12. Referring to FIG. 4, at block 72, the transmitter component 52 may receive the video data 58 and a first auxiliary signal 61a from the processor 18. As mentioned above, the video data 58 may include image data or video data that may be depicted by the display 12. The first auxiliary signal 61a received by the transmitter component 52 may include sideband data provided by the processor 18. As such, the first auxiliary signal 61a may include a part of the auxiliary data 60 received from the processor 18 and may not include any data received from the timing controller 56.

At block 74, the transmitter component 52 may convert the video data 58 and the first auxiliary signal 61a into a first serial signal. In one embodiment, to convert the video data 58 and the first auxiliary signal 61a into the first serial signal, the transmitter component 52 may first aggregate the video data 58 and the first auxiliary signal 61a using a multiplexer. The transmitter component 52 may then convert the aggregated data, which may be a parallel signal, into the first serial signal.

After converting the aggregated data into the first serial signal, at block 76, the transmitter component 52 may send the first serial signal to the display 12 via the single cable 62. In one embodiment, the transmitter component 52 may send the first serial signal to the receiver component 54, which may then convert the first serial signal back into the parallel signals that include the video data 58 and the first auxiliary signal 61a. The receiver component 54 may then transmit the parallel signals to the timing controller 56, which may use the contents of the parallel signals to depict images or video on the display 12.

The timing controller 56 may then send a second auxiliary signal 61b and the HPD signal 64 to the processor 18 via the receiver component 54. Upon receiving the second auxiliary signal 61b and the HPD signal 64, the receiver component 54 may convert the second auxiliary signal 61b (parallel signal) and the HPD signal 64 into a second serial signal. As such, the receiver component 54 may send the second serial signal to the transmitter component 52 via the single cable 62. Additional details with regard to the operations performed by the receiver component 54 are described below with reference to FIGS. 5 and 9-11.

At block 78, the transmitter component 52 may receive the second serial signal from the receiver component 54. Upon receiving the second serial signal, at block 80, the transmitter component 52 may convert the second serial signal into the second auxiliary signal 61b and the HPD signal 64 provided by the timing controller 56. The transmitter component 52 may then, at block 82, send the second auxiliary signal 61b and the HPD signal 64 to the processor 18.

As discussed above with reference to block 78, the receiver component 54 may perform certain processing steps after receiving data from the transmitter component 52. For example, FIG. 5 depicts a flowchart of a method 90 that the receiver component 54 may implement when receiving data from the processor 18 and transmitting data from the display 12 to the processor 18.

Figure 5:
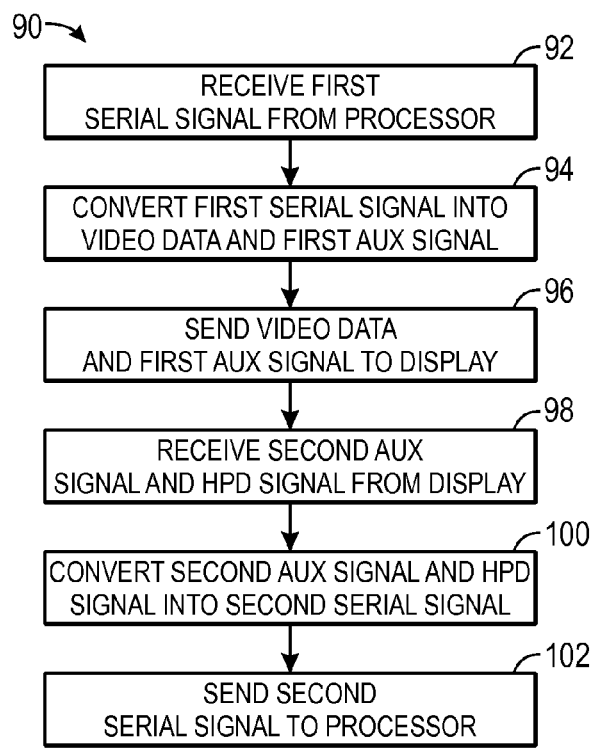
FIG. 5 is flowchart that illustrates a method for communicating between the processor and the display device of the computer of FIG. 2 using the display port link aggregator of FIG. 3 from a perspective of a receiver component located on the display device of the computer, in accordance with an embodiment.

Referring now to FIG. 5, at block 92, the receiver component 54 may receive the first serial signal from the transmitter component 52 via the single cable 62. The receiver component 54 may then, at block 94, convert the first serial signal into a parallel signal that may include the video data 58 and the first auxiliary signal 61a provided by the processor 18. At block 96, the receiver component 54 may send the video data 58 and the first auxiliary signal 61a to the timing controller 56, such that the timing controller 56 may use the video data 58 and the first auxiliary signal 61a to depict images or video on the display 12.

In addition to receiving the first serial signal from the transmitter component 52, the receiver component 54 may, at block 98, receive a second auxiliary signal 61b and the HPD signal 64 from the timing controller 56. Here, the second auxiliary signal 61b and the HPD signal 64 may be sent to the receiver component 54, such that they may be transmitted to the processor 18 via the single cable 62. The second auxiliary signal 61b received by the receiver component 54 may sideband data provided by the timing controller 56. As such, the second auxiliary signal 61b may include a part of the auxiliary data 60 received from the timing controller 56 and may not include any data received from the processor 18.

The receiver component 54 may then, at block 100, convert the second auxiliary signal 61b and the HPD signal 64 into a second serial signal. In one embodiment, the receiver component 54 may convert the second auxiliary signal 61b and the HPD signal 64 into the second serial signal by combining the second auxiliary signal 61b and the HPD signal 64. The receiver component 54 may then convert this combined signal, which may be a parallel signal, into a serial signal (i.e., the second serial signal).

At block 102, the receiver component 54 may transmit the second serial signal 61b to the transmitter component 52 via the single cable 62. Upon receiving the second serial signal, the transmitter component 52 may convert the second serial signal back into the second auxiliary signal 61b and the HPD signal 64 and send the second auxiliary signal 61b and the HPD signal 64 to the processor 18 as described above with reference to blocks 80 and 82 of FIG. 4.

Link Aggregator—Transmitter Component

Figure 6:
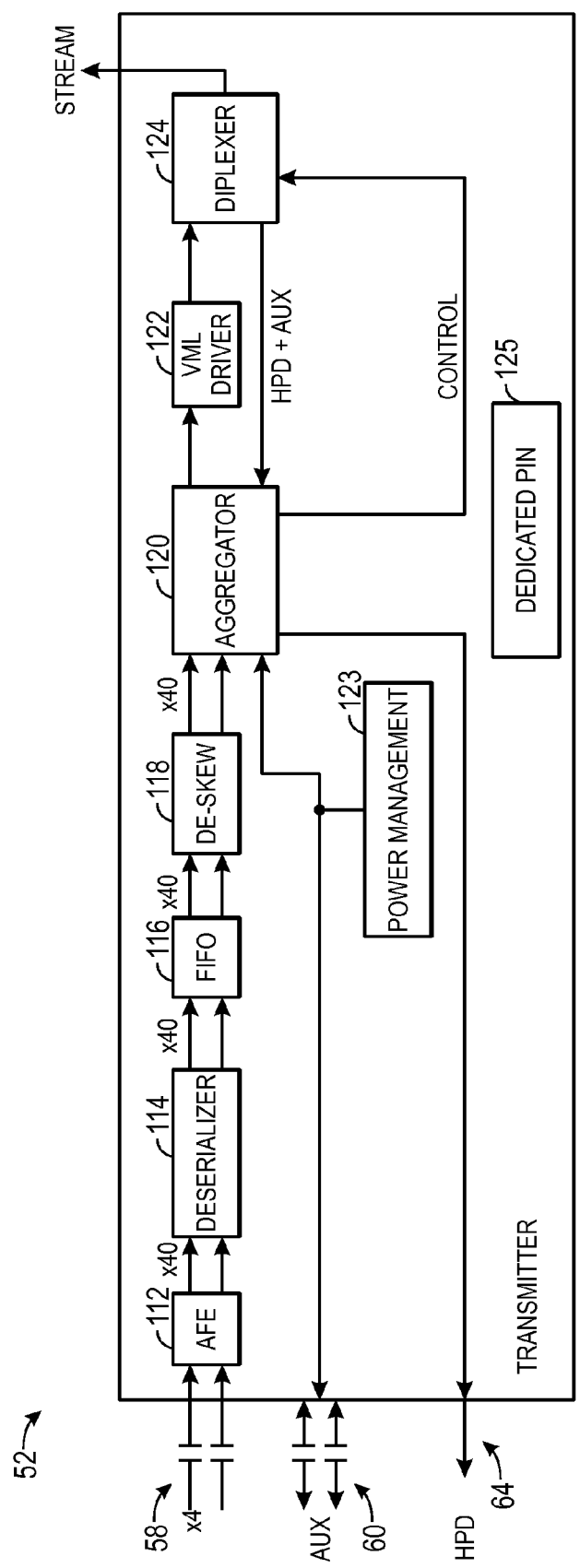
FIG. 6 is a block diagram of a transmitter component in the display port link aggregator of FIG. 5, in accordance with an embodiment.

Keeping the description of the communication process between the processor 18 and the display 12 via the link aggregator 28 in mind, FIG. 6 illustrates a block diagram of the transmitter component 52 of the link aggregator 28 described above. As shown in FIG. 6, the video data 58 may be received by the transmitter component 52 via an analog front end (AFE) component 112. In one embodiment, the AFE component 112 may receive the video data 58 via four differential pair cables. The AFE component 112 may compensate for channel attenuation effects for each respective cable using an equalizer.

The AFE component 112 may then send the attenuation-compensated video data to a deserializer component 114. In one embodiment, the deserializer component 114 may convert the attenuation-compensated video data from each differential pair cable into a 10-bit wide data stream (in the case of 8-bit-to-10-bit (8b10b) encoding), which may be referred to as packetized video data. It should be noted that the deserializer component 114 may convert the attenuation-compensated video data from each differential pair cable into any suitable sized data stream.

The packetized video data may then be input into a first-in first-out (FIFO) component 116, which may be used to align or stage the packetized video data in a particular order. In one embodiment, the FIFO component 116 may be a parallel FIFO that may include 100 bits per lane, which may be sufficient to manage 10 packets of the packetized video data. The output of the FIFO component 116 may be input into a de-skew component 118, which may be used to resolve any time delay difference between each lane of data output by the FIFO component 116.

Figure 7:
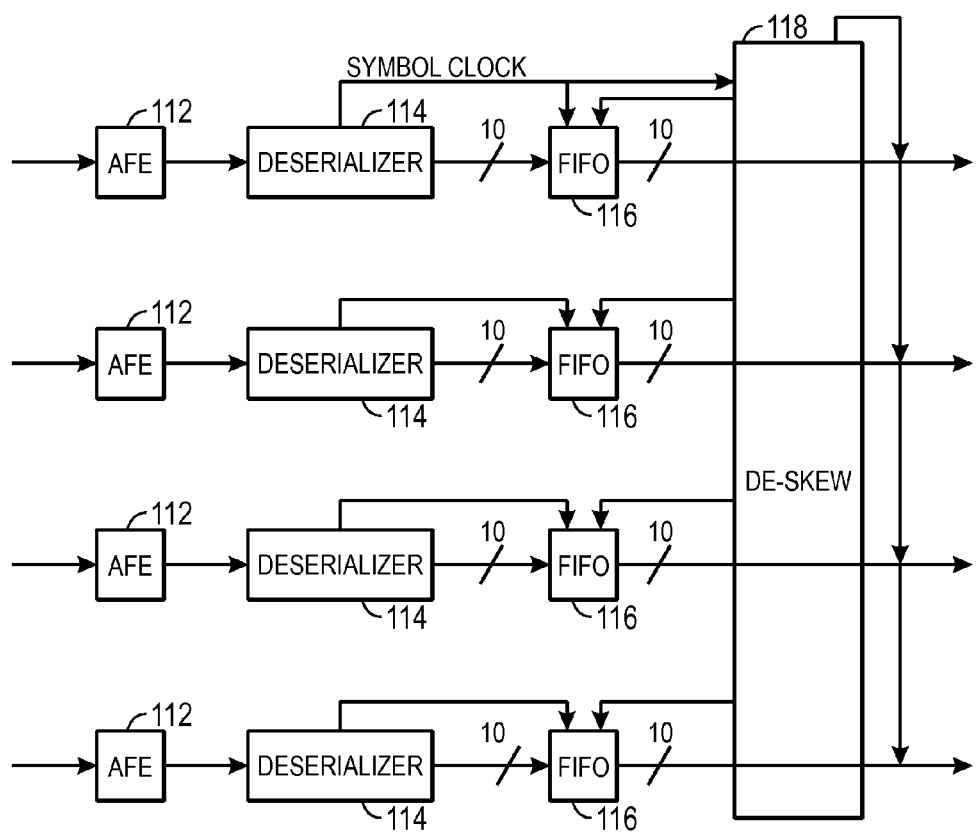
FIG. 7 is a block diagram that depicts data processing blocks in the transmitter component of FIG. 6, in accordance with an embodiment.

Keeping the foregoing in mind, FIG. 7 provides additional details regarding how the AFE component 112, the deserializer component 114, the FIFO component 116 and the de-skew component 118 may process each of the four lanes of the video data 58 received by the transmitter component 52 via the four differential cables. As illustrated in FIG. 7, each of the four lanes of the video data 58 is received by a respective AFE component 112. The output of each respective AFE component 112 may then be coupled to a respective deserializer component 114. In addition to converting each lane of the video data 58 into 10-bit wide data streams, the deserializer component 114 may generate a symbol clock used by each respective FIFO component 116 and the de-skew component 118. In one embodiment, each respective FIFO component 116 may be asynchronous and may use the symbol clock signal from the deserializer component 114 to clock in data that is received by the respective FIFO component. Each respective FIFO component 116 may then use a symbol clock signal received from the de-skew component 118 when clocking data out of each respective FIFO component 116. In certain embodiments, the symbol clock signal received from the de-skew component 118 may correspond to the symbol clock signal generated by the deserializer component 114. The symbol clock signal may depend upon the bit rate used by the FIFO component 116. Thus, in some examples, the symbol clock signal may 270 MHz or 540 MHz when the bit rate of the serial data is 2.7 GHz or 5.4 GHz, respectively.

The outputs of each respective FIFO component 114 may then be input into the de-skew component 118. In certain embodiments, the start of de-skew operation in the de-skew component 118 may be caused by either a startup or wake command that may be staggered by two clock delays for each lane of the video data 58 provided by each respective FIFO component 116. In other words, the de-skew component 118 may provide a Blank Start (BS) symbol to a first FIFO component 116 and then the de-skew component 118 may wait for two clock delays to expire before providing the BS symbol to the next FIFO component 116. The de-skew component 118 may continue to follow this procedure until the BS symbol has been sent to each FIFO component 116.

Figure 8:
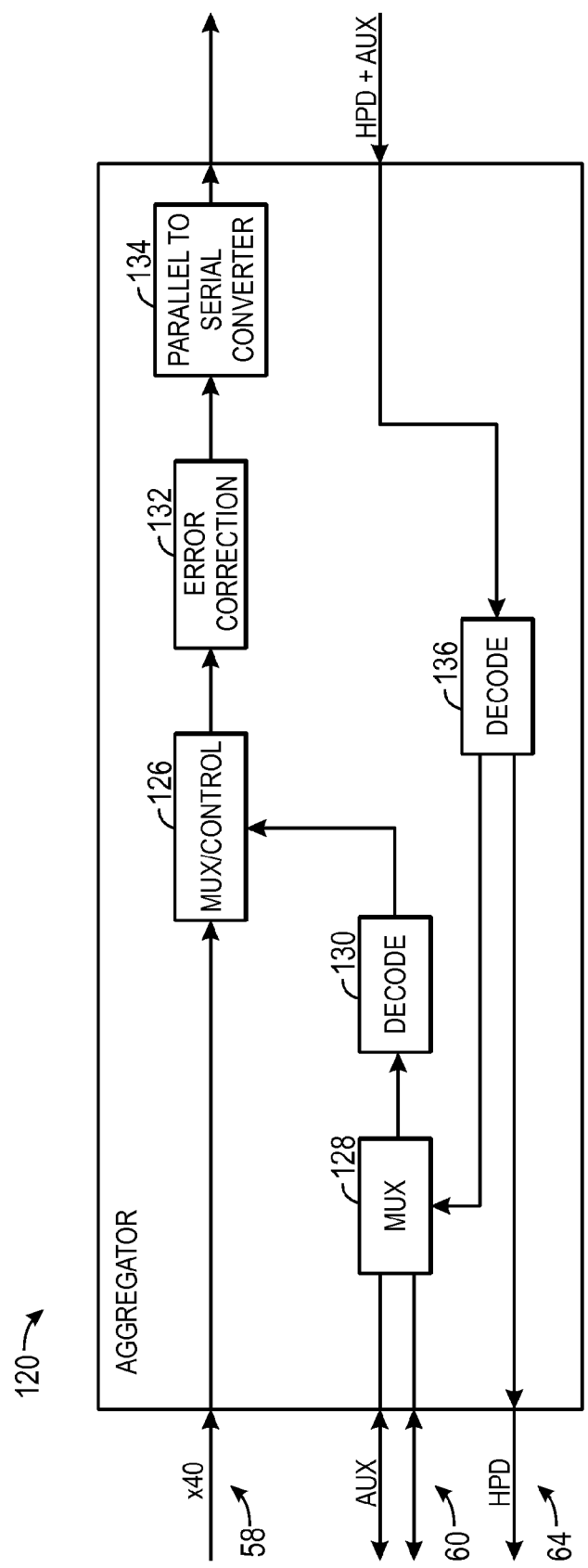
FIG. 8 is a block diagram of an aggregator component in the transmitter component of FIG. 6, in accordance with an embodiment.

Referring back to FIG. 6, when all four lanes of the video data 58 are lined up (i.e., BS has arrived in last FIFO component 116), the video data 58 may begin streaming to an aggregator component 120. In addition to receiving the video data 58 from the de-skew component 118, the aggregator 120 may receive the auxiliary data 60 from the processor 18. As such, the aggregator component 120 may aggregate the video data 58 and the auxiliary data 60 for transmission across the single cable 62. In certain embodiments, the aggregator 120 may receive the video data 58 via the de-skew component in 10-bit character increments until each respective FIFO component 116 has been emptied. In this manner, the aggregator 120 may continue its aggregation process until a system sleep command or a shutdown command has been received. Additional details with regard to how the aggregator component 120 may aggregate the video data 58 and the auxiliary data 60 will be provided below with reference to FIG. 8.

After aggregating the video data 58 and the auxiliary data 60, the aggregator 120 may send the aggregated data to a voltage model logic (VML) driver 122. The VML driver 122 may convert the aggregated data from a signal expressed in Current Model Logic (CML) into a signal expressed in Voltage Mode Logic (VML), which may be transmitted over a single cable (e.g., the single cable 62). In this manner, by sending the aggregated data over a single cable as a VML signal, the transmitter component 52 may achieve additional power savings with regard to the transmission of the aggregated data, as compared to sending the aggregated data as a CML signal.

After converting the aggregated data into the VML signal, the VML driver 122 may send the VML signal to a diplexer 124. The diplexer 124 may control the how the VML signal and the HPD signal 64 and the auxiliary data 60 received from the receiver component 54 may be transmitted from the transmitter component 52 to the receiver component 54, and vice-versa. That is, the diplexer 124 may enable the HPD signal 64 to travel upstream to the processor 18 and may enable the auxiliary data 60 to travel in both directions—to the processor 18 and to the display 12. In one embodiment, the diplexer 124 may receive a control signal from the aggregator component 120 that may be used to specify when the VML signal may be transmitted to the display 12 and when the HPD signal 64 and the auxiliary data 60 received from the receiver component 54 may be transmitted to the aggregator component 120. Additional details regarding this control signal will be provided below with reference to FIGS. 14 and 15.

In addition to the components described above, the transmitter component 52 may also include a power management component 123. The power management component 123 may manage the power used by the transmitter component 52. As shown in FIG. 6, the power management component 123 may be coupled to a data channel carrying the auxiliary data 60. As such, the power management component 123 may control the power operations of the transmitter component 52 based on data traffic related to the auxiliary data 60 received by the transmitter component 52. In one embodiment, the power management component 123 may sniff a packet of data from the auxiliary data 60 and identify power packet information embedded in the auxiliary data 60. The power management component 123 may then perform various power operations (e.g., enter sleep mode, power down) based on the power packet information. Additional details regarding the operations of the power management component 123 will be discussed below with reference to FIGS. 16 and 17. In one embodiment, the transmitter component 52 may also include a dedicated pin 125 that may be used to send a shutdown signal to the transmitter component 52.

As mentioned above, FIG. 8 provides additional details regarding how the aggregator component 120 may aggregate the video data 58 and the auxiliary data 60. The aggregator component 120 may include a multiplexer/control (MUX/control) component 126 that may receive the video data 58 via the de-skew component 118. In one embodiment, the MUX/control component 126 may receive the video data 58 as an 8b10b stream, which may be organized as interleaved data across the four lanes of the video data 58 discussed above. In some instances, the aggregator 120 may align all four lanes of the video data 58 and perform additional processing, such as depacketizing and re-encoding, such that the stream is presented as a more efficient line-coding scheme (e.g., 128b130b stream)

The aggregator component 120 may also include a MUX component 128 that may receive the auxiliary data 60 (e.g., first auxiliary signal 61*a*) from the processor 18 and the auxiliary data 60 (e.g., second auxiliary signal 61*b*) from the display 12 via the receiver component 54. As such, the MUX component 128 may control when the auxiliary data 60 provided by the processor 18 may be transmitted downstream to the display 12 and when the auxiliary data 60 provided by the display 12 may be transmitted upstream to the processor 18.

When receiving the auxiliary data 60 from the processor 18, the MUX component 128 may forward the auxiliary data 60 to a decode component 130. The decode component 130 may analyze the auxiliary data 60 and identify a horizontal or vertical blanking period (e.g., BS symbol). The decode component 130 may then send the auxiliary data 60 and the BS symbol to the MUX/control component 126. The MUX/control component 126 may then use the BS symbol at the start of the horizontal or vertical blank to infer when to start aggregating or packing the auxiliary data 60 with the video data 58 received via the de-skew component 118. By receiving the BS symbol from the decode component 130, the MUX/control component 126 may avoid employing a time slot-based mechanism to determine when to start aggregating or packing the auxiliary data 60 with the video data 58.

In one embodiment, the MUX/control component 126 may aggregate the video data 58 and the auxiliary data 60 using a multiplexer. That is, the MUX/control component 126 may aggregate the video data 58 and the auxiliary data 60 using a time division scheme. The MUX/control component 126 may then send the resulting multiplexed parallel signal to an error correction component 132. The error correction component 132 may adjust the multiplexed parallel signal for various types of errors that may occur due to the aggregation process. The error correction component 132 may then send an error-corrected parallel signal to a parallel-to-serial (P-to-S) converter component 134. The P-to-S converter 134 may serialize the error-corrected parallel signal, thereby creating a serial signal stream. In one embodiment, the symbol clock used by the P-to-S converter component 134 may be 40 times the clock used for the FIFO component 116. Therefore, the clock used for the P-to-S converter may be, for example, 10.8 or 21.6 GHz, which corresponds to 270 or 540 MHz used for the FIFO component 116.

The P-to-S converter 134 may then send the serial signal stream to the VML driver 122 of FIG. 6. As mentioned above, the VML driver 122 may convert the serial signal stream into a signal expressed in Voltage Mode Logic. The VML driver 122 may then send the resulting VML signal to the diplexer 124, which may send the VML signal to the display 12 via the single cable 62.

Although the foregoing discussion of the aggregator component 120 was made with reference to downstream communication (i.e., from processor 18 to display 12), it should be noted that the aggregator 120 may also be used to facilitate upstream communication (i.e., from display 12 to processor 18). As such, the aggregator component 120 may receive a combined signal that may include the HPD signal 64 and the auxiliary data 60 (e.g., second auxiliary signal 61*b*) from the display 12. In one embodiment, the aggregator component 120 may include a decode component 136 that may process (e.g., convert) the received combined signal to recreate the HPD signal 64 and the auxiliary data 60 received from the display 12. The decode component 136 may then send the HPD signal 64 to the processor 18 and may direct the auxiliary data 60 received from the display 12 to the MUX component 128, which may control the direction in which the auxiliary data 60 received from the display 12 may be transmitted using multiplexer employing a time division technique. That is, as mentioned above, the MUX component 128 may receive the auxiliary data 60 that originated from the processor 18 and the auxiliary data 60 that originated from the display 12. The MUX component 128 may then use a multiplexer to control when the auxiliary data 60 that originated from the processor 18 is sent to the decode component 130 and when the auxiliary data 60 that originated from the display 12 is sent to the processor 18.

Link Aggregator—Receiver Component

Referring now briefly to FIG. 3, after the serial signal stream is transmitted from the transmitter component 52 to the receiver component 54 via the single cable 62, the receiver component 54 may perform various operations to convert the serial signal stream back into the video data 58 and the auxiliary data 60 provided by the processor 18. Generally, the receiver component 54 may undo the actions of the transmitter component 52. That is, the receiver component 54 may receive a large serial bit stream that contains both the video data 58 and the auxiliary data 60 in a VML format and may perform a Serial-to-Parallel (S-to-P) conversion to output an interleaved, current mode logic (CML) signal that may be provided to the timing controller 56. The receiver component 54 may also facilitate the transmission of the auxiliary data 60 and the HPD signal 64 from the display 12 to the processor 18.

Figure 9:
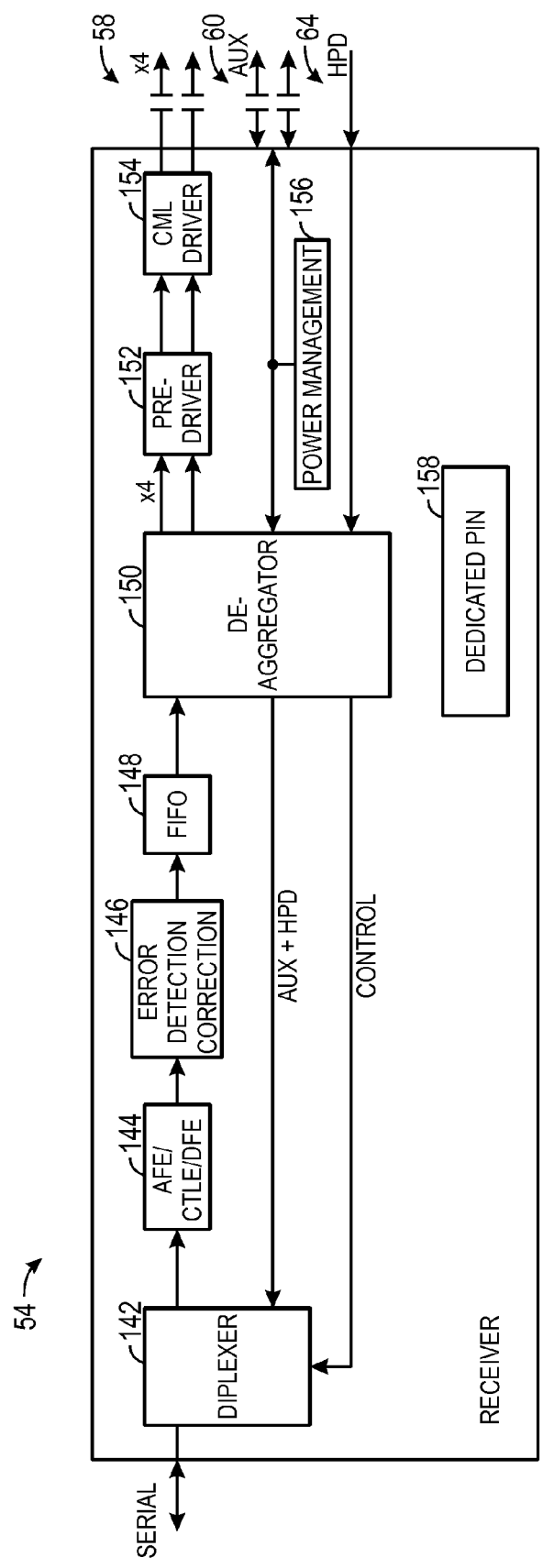
FIG. 9 is a block diagram of a receiver component in the display port link aggregator of FIG. 5, in accordance with an embodiment.

Keeping this in mind, FIG. 9 illustrates various components that may be used by the receiver component 54 to perform these operations. For instance, the receiver component 54 may include a diplexer 142 that may receive the serial signal stream from the transmitter component 52 via the single cable 62. The diplexer 142 may control the direction in which the data it receives is transmitted. As such, after receiving the serial signal stream, the diplexer 142 may forward the serial signal stream to an Analog Front End (AFE) component 144.

Since the serial signal stream may transfer between the transmitter component 52 and the receiver component 54 at a rate of up to 21.6 Gbps, which may be four times the speed between the processor 18 and the transmitter component 52, channel attenuation affects on the serial signal stream may be considerable. To compensate for any loss in the communication between the transmitter component 52 and the receiver component 54, the AFE component 144 may include an equalizer that may process the incoming serial signal stream. For example, the AFE component 144 may include either a Continuous-Time Linear Equalizer (CTLE) or a CTLE and a Decision Feedback Equalizer (DFE). In either case, the AFE component 144 may use the CTLE or the CTLE and the DFE to compensate for the channel attenuation effects that may occur during the communication between the transmitter component 52 and the receiver component 54.

After compensating the attenuated serial signal stream for the channel attenuation affects, the AFE component 144 may output the attenuation-compensated serial signal stream to an error detection and correction component 146. In one embodiment, the error detection and correction component 146 may include a squelch circuit to detect when the serial signal stream is being received by the error detection and correction component 146. As such, the squelch circuit may send a wake command to the error detection and correction component 146 when it detects that the serial signal stream is being received by the error detection and correction component 146. Here, the error detection and correction component 146 may use the wake command to determine when it should operate and when it may enter a sleep mode or power off.

The error detection and correction component 146 may also detect and correct the attenuation-compensated serial signal stream for various types of errors that may occur due to the equalization process performed by the AFE component 144. The error detection and correction component 146 may then send an error-corrected serial signal stream to a FIFO component 148, which may stage (e.g., organize and align) the error-corrected serial signal stream for input into a de-aggregator component 150.

Generally, the de-aggregator component 150 may convert the error-corrected serial signal stream back into the video data 58 and the auxiliary data 60 received from the processor 18. The video data 58 generated by the de-aggregator component 150, however, may be in a VML format. As such, the de-aggregator component 150 may send the video data 58 to a pre-driver component 152 to prepare the video data 58 for processing by a Current Mode Logic (CML) driver 154. The CML driver 154 may then reconstruct the video data 58 in the VML format into a CML format, which may correspond to the original format provided by the processor 18.

In addition to outputting the video data 58, the de-aggregator component 150 may output the auxiliary data 60 received from the processor 18. However, the auxiliary data 60 may be directly sent to the timing controller 56 without any additional processing. In one embodiment, a power management component 156 may monitor the data channel carrying the auxiliary data 60 output by the de-aggregator component 150. Like the power management component 123 described above, the power management component 156 may manage the power used by the receiver component 54. As such, the power management component 123 may control the power operations of the receiver component 54 based on data traffic related to the auxiliary data 60 output by the de-aggregator component 150.

In certain embodiments, like the transmitter component 52, the receiver component 54 may also include a dedicated pin 158 to control certain power operation modes of the receiver component 54. For example, the dedicated pin 158 may be used to send a shutdown signal to the receiver component 54.

Figure 10:
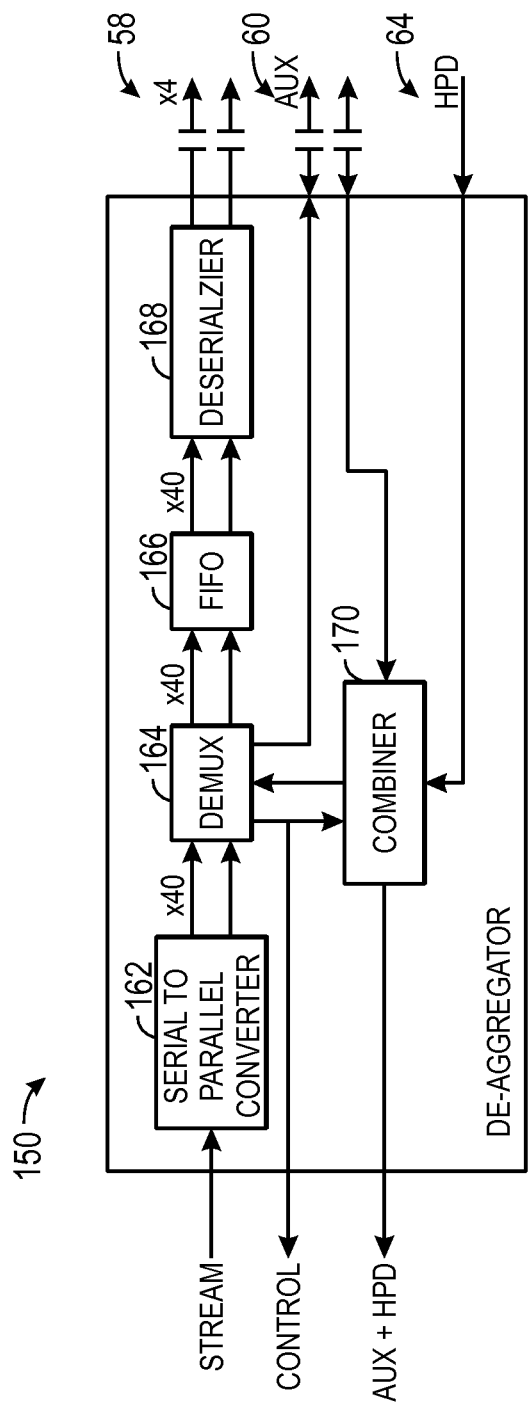
FIG. 10 is a block diagram of a de-aggregator component in the receiver component of FIG. 9, in accordance with an embodiment.

Referring back to the de-aggregator component 150, FIG. 10 provides additional details regarding how the de-aggregator component 150 may de-aggregate the error-corrected serial signal stream received from the FIFO component 148. As shown in FIG. 10, the de-aggregator 150 may receive the error-corrected serial signal stream at a serial-to-parallel (S-to-P) component 162. The S-to-P component 162 may convert the received error-corrected serial signal stream into a parallel signal (e.g., 40 bits in parallel). In one embodiment, the S-to-P component 162 may examine control symbols of the incoming stream to determine how the parallel signal is to be output. For example, the S-to-P component 162 may use a BS symbol to determine a correct lane to direct the parallel signal: the first blanking start for lane 0, the second for lane 1, etc.

The S-to-P component 162 may then send the parallel signal to a de-MUX component 164. The de-MUX component 164 may separate the video data 58 and the auxiliary data 60 originating from the processor 18 from the parallel signal. After separating the auxiliary data 60 from the parallel signal, the de-MUX component 164 may send the auxiliary data 60 to the timing controller 56. In one embodiment, when the S-to-P component 162 processes the auxiliary data 60 sent towards the timing controller 56, the S-to-P component 162 may direct the auxiliary data 60 along a different path to the de-MUX component 164 as compared to the path used to send the video data 58. However, the S-to-P component 162 may also send dummy data with the video data 58 to the de-MUX component 164 to ensure that a scrambler in the de-MUX component 164 does not get out of sync due to the missing auxiliary data 60.

After separating the video data 58 from the parallel signal, the de-MUX component 164 may send the video data 58 to a FIFO component 166, which may stage the parallel video data 58 for a serializer component 168. The serializer component 168 may serialize the 40 parallel bits of data into 4 parallel bits of data that may be transmitted via four differential pair cables (e.g., 4 micro-coaxial cables). Additional details with regard to how the parallel bits of data may be converted and transmitted by the de-aggregator component 150 are provided below with reference to FIG. 11.

Figure 11:
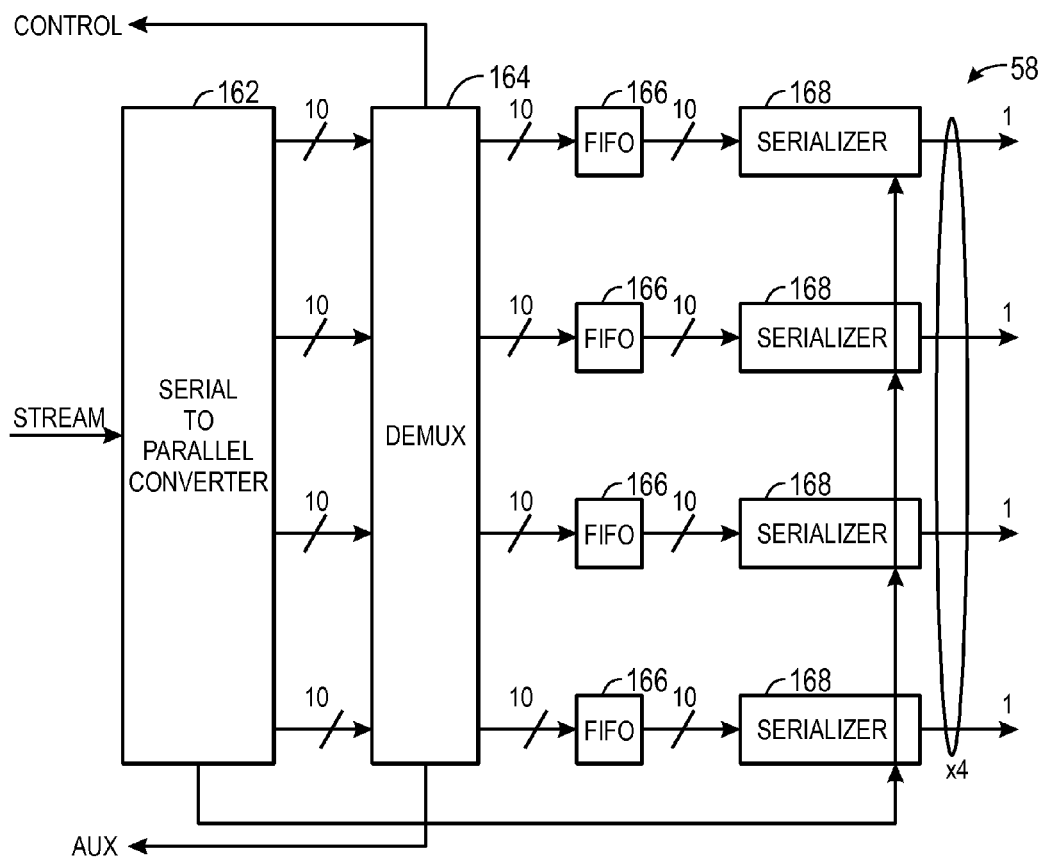
FIG. 11 is a block diagram that provides additional details regarding the components of the de-aggregator component of FIG. 10, in accordance with an embodiment.

As shown in FIG. 11, the S-to-P converter component 162 may convert a single serial stream into four parallel 10-bit lanes of data. After some processing by the respective de-MUX components 164 and the respective FIFO components 166, a respective serializer component 168 may receive a respective 10-bit parallel lane of data and convert the received data into a single-bit parallel lane of data. Each respective serializer component 168 may then transmit the video data 58 via, for example, four differential pair cables to the timing controller 56.

In addition to sending the video data 58 and the auxiliary data 60 that originated from the processor 18 to the timing controller 56, the de-aggregator component 150 may also receive the auxiliary data 60 and the HPD signal 64 from the timing controller 56. In this case, the de-aggregator component 150 may receive the auxiliary data 60 and the HPD signal 64 at a combiner component 170. In one embodiment, the combiner component 170 may combine the auxiliary data 60 and the HPD signal 64 into a single signal. For example, the combiner component 170 may combine the auxiliary data 60 and the HPD signal 64 into data that may correspond to a Video Electronics Standards Association (VESA) Mobility Display Port (MYDP) Standard Version 1 format.

In one embodiment, the combiner component 170 may combine the auxiliary data 60 into a single signal using a Mobility DisplayPort (myDP) standard. For the HPD signal 64, the combiner component 170 may perform some form of level shifting on the single cable 62. For example, the combiner component 170 may take the signal level significantly higher than would be seen during an auxiliary signaling. In another embodiment, the combiner component 170 may ignore HPD interrupts in the HPD signal 64 and allow a source device to perform polling.

When the auxiliary data 60 and the HPD signal 64 is being sent upstream to the processor 18, the combiner component 170 may send a request to the de-MUX component 164 to perform a directional switch for a fixed time interval. In turn, the de-MUX component 164 may send the request (e.g., as a control signal) to the diplexer 142. The diplexer 142 may, in turn, switch and send data upstream. After a fixed time interval, the diplexer 142 may switch back to sending data downstream to the display 12.

Link Training

Figure 12:
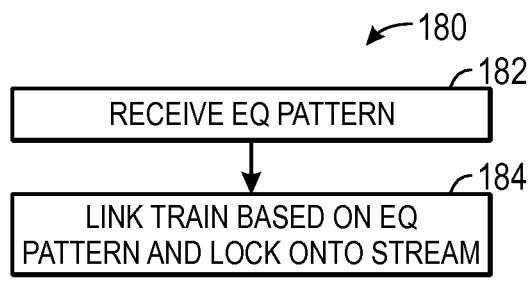
FIG. 12 is a flowchart that illustrates a method for link training the transmitter component of FIG. 6 and the receiver component of FIG. 9, in accordance with an embodiment.

In certain embodiments, prior to communicating between the transmitter component 52 and the receiver component 54, the link aggregator 28 may establish a link between the transmitter component 52 and the receiver component 54. In particular, there may be two situations where the link aggregator 28 may establish a link between the transmitter component 52 and the receiver component 54. The first situation may include when the transmitter component 52 and the receiver communicates from an initial cold start. FIG. 12 illustrates a flowchart of a method 180 for link training the transmitter component 52 and the receiver component 54 from an initial cold start.

At block 182, the receiver component 54 may receive an equalizer (EQ) pattern from the transmitter component 52. In one embodiment, the AFE component 144 may receive the EQ pattern, which may be used for training the receiver component 54 to receive the serial signal stream from the transmitter component 52. At block 184, the AFE component 144 may train the receiver component 54 to receive the serial signal stream being sent from the transmitter component 52 based on the EQ pattern. That is, the AFE component 144 may use the EQ pattern to lock onto the serial signal stream being sent from the transmitter component 52.

The second situation where the link aggregator 28 may establish a link between the transmitter component 52 and the receiver component 54 may include whenever the diplexer 124 or the diplexer 142 switches between high-bandwidth (i.e., downstream) and low-bandwidth (i.e., upstream) modes. When the diplexer 124 or the diplexer 142 switches between high-bandwidth (i.e., downstream) and low-bandwidth (i.e., upstream) modes, the link aggregator 28 may employ a method 190 for quick syncing the transmitter component 52 and the receiver component 54, as illustrated in FIG. 13.

Although the cold start link-training method of FIG. 12 may be more elaborate and may include a larger amount of time for the transmitter component 52 and the receiver component 54 to block the handshake between the two, the method 190 for quick syncing the transmitter component 52 and the receiver component 54 may be used to restore a sync between the transmitter component 52 and the receiver component 54 and begin a reliable data exchange between the two in a relatively short amount of time.

Figure 13:
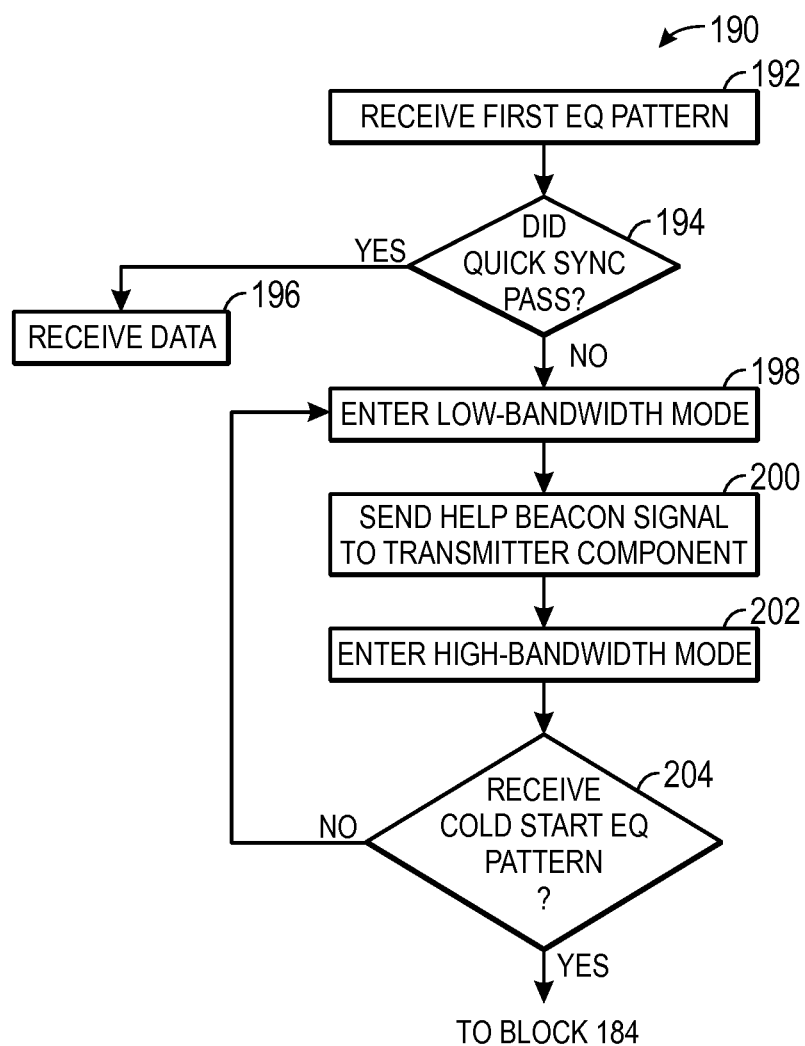
FIG. 13 is flowchart that illustrates a method for quick syncing the transmitter component of FIG. 6 and the receiver component of FIG. 9, in accordance with an embodiment.

Referring now to FIG. 13, to establish a quick synchronization between the transmitter component 52 and the receiver component 54, at block 192, the receiver component 54 may receive a first EQ pattern from the transmitter component 52. This first EQ pattern may be different from the EQ pattern used to initially link train the transmitter component 52 and the receiver component 54 from an initial cold start.

At block 194, the receiver component 54 may determine whether the quick sync passed. If the quick sync did pass, the receiver component 54 may proceed to block 196 and begin receiving streaming data (e.g., serial signal stream) from the transmitter component 52. If, however, the quick sync did not pass, the receiver component 54 may proceed to block 198 and begin the process for a complete cold start. As such, at block 198, the receiver component 54 may enter a low-bandwidth mode, which may enable the receiver component 54 to send data upstream to the transmitter component 52.

The receiver component 54 may then, at block 200, send a help beacon signal to the transmitter component 52. After some amount of time expires from sending the help beacon, the receiver component 54 may, at block 202, enter a high-bandwidth mode, such that it may receive data from the transmitter component 52.

At block 204, the receiver component 54 may determine whether it received the initial cold start EQ pattern. If the receiver component 54 did not receive the initial cold start EQ pattern, the receiver component 54 may return to block 198 and repeat blocks 198-204 until the transmitter component 52 responds with a cold start signal (i.e., send the initial cold start EQ pattern).

Referring back to block 204, if the receiver component 54 did receive the initial cold start EQ pattern, the receiver component 54 may proceed to block 184 of the method 180 to link train the receiver component 54. By employing the method 190 for quick syncing the transmitter component 52 and the receiver component 54, the receiver component 54 may be able to come online and be capable of 20 Gbps transmission in a relatively short amount of time (i.e., relative to cold start process). Moreover, since the receiver component 54 may not have access to a source synchronous clock or crystal until it receives a transmission from the transmitter component 52, the method 190 for quick syncing the receiver component 54 may prevent the timing in the receiver component 54 from drifting away because of the proposed clock/crystal free architecture.

Bandwidth Mode Switchover Mechanism

In addition to employing a method for synchronizing the communication between the transmitter component 52 and the receiver component 54, the link aggregator 28 may employ a process for its transmitter component 52 and its receiver component 54 to switch between operating in a high-bandwidth mode and a low-bandwidth mode. As discussed above, the transmitter component 52 and the receiver component 54 may control the direction of the transmission of data by multiplexing the data using a time division scheme. In one embodiment, the transmitter component 52 may be the master device and may send a control signal to its slave device, the receiver component 54. The control signal may allot for a time slot for upstream transmission (e.g., low bandwidth; timing controller 56 to processor 18) to complete and allot for a time slot for downstream transmission (e.g., high bandwidth; processor 18 to timing controller 56) to return. To enable transmission directions between upstream to downstream or vice-versa to switch, the transmitter component 52 and the receiver component 54 may switch between low-bandwidth mode and high-bandwidth mode at the same time.

Figure 14:
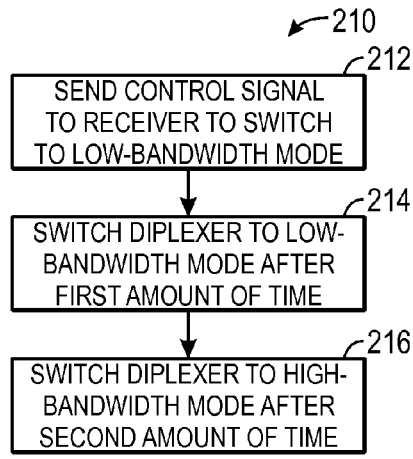
FIG. 14 is flowchart that illustrates a method for switching between a high-bandwidth transmission mode to a low-bandwidth transmission mode from a perspective of the transmitter component of FIG. 6, in accordance with an embodiment.

Keeping the foregoing in mind, FIG. 14 depicts a flowchart of a method 210 for switching between a high-bandwidth transmission mode to a low-bandwidth transmission mode from a perspective of the transmitter component 52. At block 212, the transmitter component 52 may send a control signal to the receiver component 54. The control signal may include a command for the receiver component 54 to switch into a low-bandwidth mode.

At block 214, the transmitter component 52 may switch the diplexer 124 to a low-bandwidth mode. In one embodiment, the transmitter component 52 may wait for some amount of time to pass from when it sends the control signal before the transmitter component 52 switches the diplexer 124 into the low-bandwidth mode. In one embodiment, the amount of time that the transmitter component 52 may wait may correspond to a delay time for the receiver component 54 to receive the control signal and switch the diplexer 142 of the receiver component 54 into the low-bandwidth mode.

The transmitter component 52 may then wait for a second amount of time to pass from when the diplexer 124 switches into the low-bandwidth mode. After the second amount of time expires, the transmitter component 52, at block 216, may switch the diplexer to a high-bandwidth mode.

Figure 15:
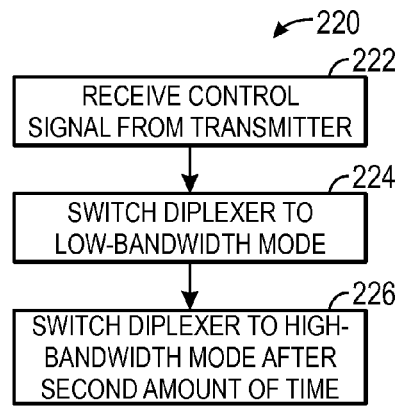
FIG. 15 is flowchart that illustrates a method for switching between a high-bandwidth transmission to a low-bandwidth transmission from a perspective of the receiver component of FIG. 9, in accordance with an embodiment.

Keeping the method 210 of FIG. 14 in mind, FIG. 15 illustrates a flowchart of a method 220 that corresponds to the method 210 for switching between a high-bandwidth transmission mode to a low-bandwidth transmission mode from a perspective of the receiver component 54. As such, the method 220 describes the actions of the receiver component 54 while the transmitter component 52 performs the process indicated in method 210 of FIG. 14.

Referring now to FIG. 15, at block 222, the receiver component 54 may receive the control signal from the transmitter component 52. As mentioned above, the control signal may include a command for the receiver component 54 to switch into the low-bandwidth mode.

At block 224, the receiver component may switch the diplexer 142 into the low-bandwidth mode. Referring briefly back to block 214 of FIG. 14, since the transmitter component 52 may wait for an amount of time (e.g., delay time for the receiver component 54 to receive the control signal and switch the diplexer 142) before switching the diplexer 142 to the low-bandwidth mode, the time at which the diplexer 124 switches to the low-bandwidth mode may be substantially the same time that the diplexer 142 switches into the low-bandwidth mode.

Referring back to FIG. 15, after switching the diplexer 142 into the low-bandwidth mode, the receiver component 54 may then wait for some amount of time to pass from when the diplexer 142 switches to the low-bandwidth mode. After waiting for the amount of time to pass, at block 226, the receiver component 54 may switch the diplexer 142 to the high-bandwidth mode. In one embodiment, the amount of time that the receiver component 54 waits may correspond to the second amount of time that the transmitter component 52 waits before switching the diplexer 124 to the high-bandwidth mode. In this manner, the diplexer 124 of the transmitter component 52 and the diplexer 142 of the receiver component 54 may switch from the low-bandwidth mode to the high-bandwidth mode at substantially the same time.

Power Management

As mentioned above, the transmitter component 52 and the receiver component 54 may include a power management component 123 and a power management component 156, respectively. In certain embodiments, the power management component 123 and the power management component 156 may receive a signal from a squelch circuit disposed on the transmitter component 52 or the receiver component 54 that indicates an amount of time since the squelch circuit detected any data being transmitted or received.

Figure 16:
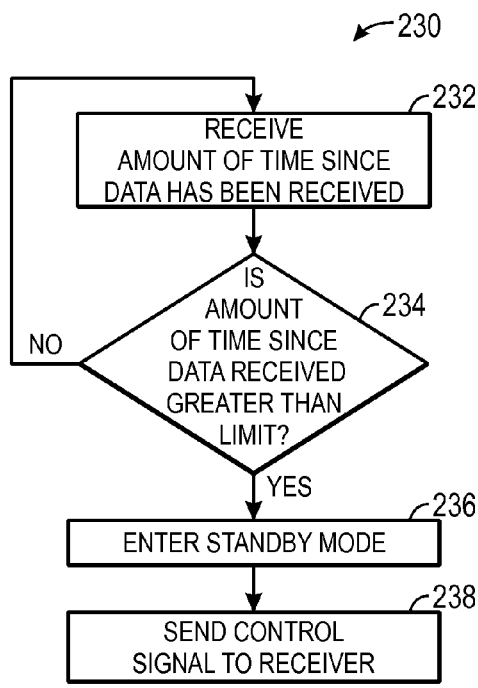
FIGS. 16 and 17 are flowcharts that illustrate methods for entering a standby mode based on data received by the data link aggregator of FIG. 5, in accordance with an embodiment.

Keeping this in mind, FIG. 16 depicts a flowchart of a method 230 that the transmitter component 52 or the receiver component 54 may employ when placing the transmitter component 52 or the receiver component 54 in a standby or sleep power mode. For the purposes of facilitating a discussion of the power management techniques, the method 230 will be described from the perspective of the power management component 123 of the transmitter component 52. However, it should be understood that the power management component 156 of the receiver component 54 may also perform the process indicated by the method 230.

At block 232, the power management component 123 may receive an amount of time since data has been received or detected on the data channel being monitored. In one embodiment, the amount of time may be monitored and provided to the power management component 123 from a squelch circuit. At block 234, the power management component 123 may determine whether the amount of time is greater than some limit. If the amount of time is not greater than the limit, the power management component 123 may return to block 232.

If, however, the amount of time is greater than the limit, the power management component 123 may proceed to block 236 and enter a standby or sleep mode. In this case, the power management component 123 may place various components in the transmitter component 52 into a low-power consumption mode. At block 238, the power management component 123 may send a control signal to the receiver component 54 indicating that the transmitter component 52 is entering a standby or sleep mode.

In addition to using information from a squelch circuit to determine when to enter a standby or sleep mode, the power management component 123 and the power management component 156 when the HPD signal 64 from the timing controller 56 is low. For example, FIG. 17 illustrates a flowchart of a method 240 for entering a standby or sleep mode based on the HPD signal 64.

Figure 17:
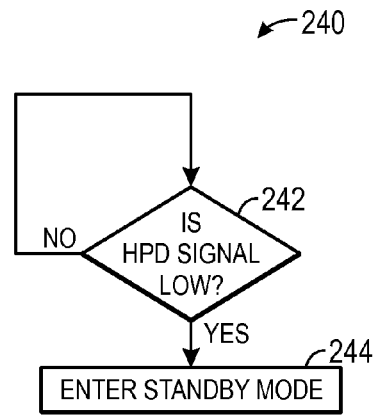

As shown in FIG. 17, at block 242, the power management component 123 and/or the power management component 156 may determine whether the HPD signal 64 is low. That is, the power management component 123 and/or the power management component 156 may determine whether the HPD signal 64 is below some value. If the HPD signal 64 is indeed low, the power management component 123 and/or the power management component 156, at block 244, may enter the standby or sleep mode. Alternatively, if the HPD signal 64 is not low, the power management component 123 and/or the power management component 156 may continue to monitor the HPD signal 64.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A display port aggregator, comprising:
 a transmitter component configured to:
  receive a first parallel signal comprising video data and a second parallel signal comprising auxiliary data from a processor, wherein the video data comprises one or more images to be displayed on a display device;
  aggregate the first parallel signal and the second parallel signal, thereby generating a serial signal; and
  transmit the serial signal via a single cable to the display device; and
 a receiver component configured to:
  receive the serial signal from the transmitter component via the single cable;
  de-aggregate the serial signal by performing a serial-to-parallel conversion of the serial signal to output the first parallel signal and the second parallel signal; and
  send the first parallel signal and the second parallel signal to a timing controller of the display device, wherein the timing controller is configured to display the images on the display device, wherein receiver component is configured to link train with the transmitter component at least partly by:
   receiving a first equalizer pattern from the transmitter component to initialize a link between the transmitter component and the receiver component;
   receiving a second equalizer pattern from the transmitter component after the receiver component and the transmitter component switches from a downstream transmission to an upstream transmission or vice-versa;
   determining whether the transmitter component quick synced with the receiver component using the second equalizer pattern, wherein the first equalizer pattern is different from the second equalizer pattern;
   receiving the first equalizer pattern from the transmitter component when the transmitter component has not quick synced with the receiver component using the second equalizer pattern; and
   locking onto a second serial signal based at least in part on the first equalizer pattern.

2. The display port aggregator of claim 1, wherein the processor comprises a graphics processing unit (GPU).

3. The display port aggregator of claim 1, wherein the transmitter component is configured to aggregate the first parallel signal and the second parallel signal by:
 multiplexing the first parallel signal and the second parallel signal, thereby generating a third parallel signal; and
 converting the third parallel signal into the serial signal.

4. The display port aggregator of claim 1, wherein transmitter component is configured to transmit the serial signal using a diplexer configured to control a direction in which the serial signal is transmitted.

5. The display port aggregator of claim 1, wherein the auxiliary data comprises sideband data configured for link training protocols, hand shaking protocols, or any combination thereof.

6. The display port aggregator of claim 1, wherein the single cable is disposed within a clutch barrel of a laptop computing device.

7. The display port aggregator of claim 1, wherein the single cable comprises a micro-coaxial cable.

8. The display port aggregator of claim 1, wherein the receiver component is configured to de-aggregate the serial signal by:
 converting serial signal into a third parallel signal; and
 de-multiplexing the third parallel signal into the first parallel signal and the second parallel signal.

9. The display port aggregator of claim 1, wherein receiver component is configured to link train with the transmitter component prior to receiving the serial signal from the transmitter component by:
 receiving an equalizer pattern from the transmitter component; and
 locking onto the serial signal based at least in part on the equalizer pattern.

10. The display port aggregator of claim 1, wherein the receiver component is configured to send a help beacon to the transmitter component when the transmitter component has not quick synced with the receiver component.

11. A system, comprising:
 a motherboard comprising a processor configured to send a first parallel signal comprising video data and a second parallel signal comprising a first set of auxiliary data to a timing controller, wherein the video data comprises one or more images to be displayed;
 a display device comprising the timing controller configured to:
  display the one or more images on the display device; and
  send a second set of auxiliary data to the processor; and
 a link aggregator configured to control communication between the processor and the timing controller, wherein the link aggregator comprises a first component disposed within the display device and a second component disposed within the motherboard, wherein the first component is configured to:
  receive a first equalizer pattern from the second component to initialize a link between the processor and the timing controller;
  receive a second equalizer pattern from the second component after the first component and the second component switches from a downstream transmission to an upstream transmission, wherein the first component receives a serial signal comprising the first parallel signal aggregated with the second parallel signal from the processor during the downstream transmission;
  determine whether the second component quick synced with the first component using the second equalizer pattern, wherein the first equalizer pattern is different from the second equalizer pattern;
  receive the first equalizer pattern from the second component when the second component has not quick synced with the first component; and
  lock onto a second serial signal based at least in part on the first equalizer pattern.

12. The system of claim 11, comprising a clutch barrel configured to communicatively couple the motherboard and the display device via the single cable.

13. The system of claim 11, wherein the processor is configured to:
  receive a Hot Plug Detect (HPD) signal from the timing controller;
  determine whether the HPD signal is below a value; and
  enter a standby mode when the HPD signal is below the value.

14. The system of claim 11, wherein the first component is configured to:
  receive the HPD signal and the second set of auxiliary data from the timing controller;
  combine the HPD signal and the second set of auxiliary data into a single signal represented as a voltage mode logic signal; and
  send the single signal via a single cable to the motherboard using a first diplexer configured to control a direction in which data is transmitted between the display device and the motherboard.

15. The system of claim 14, wherein the first component is configured to send the single signal by sending a request to a de-multiplexing component to send a directional switch request to the first diplexer, wherein the de-multiplexing component is configured to separate the video data and the first set of auxiliary data from an aggregated signal.

16. The system of claim 14, wherein the single cable comprises a micro-coaxial cable.

17. The system of claim 14, wherein the second component is configured to:
  receive the single signal using a second diplexer;
  decode the single signal into an interleaved, current mode logic signal comprising the HPD signal and the second set of auxiliary data; and
  send the HPD signal and the second set of auxiliary data to the processor.

18. The system of claim 17, wherein the second diplexer is configured to send an aggregated signal comprising the first parallel signal and the second parallel signal to the first diplexer.

19. A method, comprising:
  sending a first equalizer pattern to a receiver component disposed within a display device, wherein the first equalizer pattern is configured to initialize a link between a transmitter component and the receiver component;
  receiving a first parallel signal comprising video data and a second parallel signal comprising auxiliary data from a processor;
  sending the first parallel signal and the second parallel signal as an aggregated signal to the receiver component, wherein the aggregated signal comprises a serial signal represented as a voltage mode logic signal;
  sending a second equalizer pattern after the receiver component switches from an upstream transmission to a downstream transmission or vice-versa;
  sending the first equalizer pattern to the receiver component when the receiver component has not quick synced with the receiver component using the second equalizer pattern, wherein the first equalizer pattern is different from the second equalizer pattern; and
  locking onto a second serial signal based at least in part on the first equalizer pattern.

20. The method of claim 19, wherein the aggregated signal comprises the first parallel signal multiplexed with the second parallel signal.

21. The method of claim 19, comprising:
  determining whether an amount of time since when data has been received via the second parallel signal exceeds a value; and
  entering a standby mode when the amount of time since when data has been received via the second parallel signal exceeds the value.

22. An electronic device comprising:
  a motherboard comprising:
    a processor configured to generate a first parallel signal comprising video data and a second parallel signal comprising a first set of auxiliary data, wherein the video data comprises one or more images to be displayed; and
    a transmitter component configured to aggregate the first parallel signal and the second parallel signal, thereby generating a serial signal represented as a voltage mode logic signal; and
  a display device comprising
    a receiver component configured to:
      receive a first equalizer pattern from the transmitter component to initialize a link between the transmitter component and the receiver component;
      de-aggregate the serial signal to obtain an interleaved, current mode logic signal comprising the first parallel signal and the second parallel signal;
      receive a second equalizer pattern from the transmitter component after the first component receives the serial signal and after the receiver component and the transmitter component switches from an upstream transmission to a downstream transmission or vice-versa;
      determine whether the receiver component quick synced with the transmitter component using the second equalizer pattern, wherein the first equalizer pattern is different from the second equalizer pattern;
      receive the first equalizer pattern from the transmitter component when the receiver component has not quick synced with the transmitter component; and
      lock onto a second serial signal based at least in part on the first equalizer pattern; and
    a timing controller configured to display the images that correspond to the first parallel signal.

23. The electronic device of claim 22, wherein the receiver component is configured to:
- receive a Hot Plug Detect (HPD) signal and a second set of auxiliary data from the timing controller;
- combine the HPD signal and the second set of auxiliary data into a single signal; and
- send the single signal via a single cable to the motherboard using a first diplexer disposed within the receiver component, wherein the first diplexer is configured to control a direction in which data is transmitted between the display device and the processor.

24. The electronic device of claim 23, wherein the receiver component is configured to send the single signal by:
- receiving a control signal from the transmitter component, wherein the control signal is configured to cause the first diplexer to route data from the display device to the processor;
- switching the direction of the first diplexer to route data from the display device to the processor in response to receiving the control signal;
- sending the single signal to the motherboard via the single cable; and
- switching the direction of the first diplexer to route data from the processor to the display device after an amount of time expires.

25. The electronic device of claim 23, wherein the transmitter component is configured to receive the single signal by:
- sending a control signal to the receiver component, wherein the control signal is configured to cause the first diplexer to route data from the display device to the processor;
- switching a direction of a second diplexer disposed within the transmitter component to route data from the display device to the processor after a first amount of time expires;
- receiving the single signal from the receiver component via the single cable; and
- switching the direction of the first diplexer to route data from the processor to the display device after a second amount of time expires.

* * * * *